United States Patent Office 3,122,552
Patented Feb. 25, 1964

3,122,552
PIPERIDINE HEXAFLUOROPHOSPHATE AND HEXAFLUOROARSENATE COMPOUNDS
Hugh T. Harrison, Midland, Mich., assignor to The Dow Chemical Company, Midland, Mich., a corporation of Delaware
No Drawing. Filed June 4, 1962, Ser. No. 199,628
1 Claim. (Cl. 260—271)

The present invention is directed to the novel salts of hexafluoroarsenic or hexafluorophosphoric acid and piperidine. These salts correspond to one of the formulae:

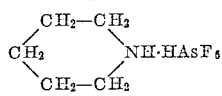

and

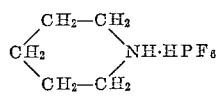

The present compounds are crystalline materials, of low solubility in organic compounds and of moderate solubility in water. They are useful as parasiticides, and are adapted to be employed in the control of insect, bacterial and fungal pests such as *Alternaria solani* (tomato early (blight) and brown rot fungus.

The novel compounds can be prepared by reacting piperidine and hexafluoroarsenic or hexafluorophosphoric acid. Conveniently, the reaction is carried out in an inert liquid reaction medium, such as water. Good results are obtained when substantially equimolecular proportions of the reactants are employed. The reaction is exothermic and takes place smoothly at temperatures of from −10° to 80° C.

In carrying out the reaction, the piperidine is contacted with the hexafluoroarsenic or hexafluorophosphoric acid in any conventional manner. The contacting is conveniently carried out by adding one reactant to the other reactant. Oftentimes it is convenient to employ a hydrate form of the acid reactant. The temperature of the resulting reaction medium can be controlled by regulating the rate of the contacting of the reactants as well as by external cooling. Sometimes the desired product precipitates in the mixture during the reaction. Where desirable to maintain fluid condition such product can be separated in part by conventional procedures. Upon completion of the contacting of the reactants, most of the reaction will have taken place with the production of the desired product. Where optimum yields are desired, it is often convenient that the reaction mixture be allowed to stand several hours to insure substantial completion of reaction. Upon completion of the reaction, the solvent can be removed from the reaction mixture by evaporation or distillation under reduced pressure to obtain the salt product as a residue. This product can be further purified by convential procedures such as washing with water or suitable organic liquid and recrystallization.

In a representative operation, 50 milliliters of piperidine (0.50 mole) are added portionwise and with stirring to an aqueous 65 percent solution of hexafluoroarsenic acid (equivalent to 100 grams; 0.52 mole of $HAsF_6$). The aqueous $HAsF_6$ solution employed herein is a commercial product containing 65 percent $HAsF_6$, 21 percent $H_2O$, and 14 percent related arsenic acids. The addition is carried out over a period of thirty minutes and at a slowly rising temperature initially near to 0° C. Upon completion of the addition, the reaction mixture is filtered to obtain the white crystalline piperidine hexafluoroarsenate product as a residue. This product is then dried under vacuum and found to melt at from 71° to 73° C.

In a similar manner, piperidine hexafluorophosphate (melting at from 144° to 146° C.) is prepared by reacting together piperidine and an aqueous 65 percent solution of hexafluorophosphoric acid in the manner described in the preceding paragraph.

The present compounds are useful as parasiticides in various insecticidal, nematocidal and antimicrobicidal compositions. For such use, the unmodified compounds can be employed. However, the present invention also encompasses the use of the compounds together with a parasiticide adjuvant. In such use, the compounds can be dispersed upon a finely divided solid and the resulting preparations employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions, or water dispersions with or without the addition of wetting, dispersing or emulsifying agents. In representative operations, piperidine hexafluorophosphate gives 100 percent controls of tomato late blight and brown rot fungus at concentrations of 10 parts per million by weight of total solution.

I claim:
The monosalt of piperidine and a member of the group consisting of hexafluoroarsenic acid and hexafluorophosphoric acid.

References Cited in the file of this patent

UNITED STATES PATENTS 2,900,384 Rudner _____ Aug. 18, 1959
2,957,873 Rudner _____ Oct. 25, 1960
2,957,876 Rudner _____ Oct. 25, 1960

OTHER REFERENCES

Noller: Chemistry of Organic Compounds, 2nd ed., page 621 (1957).